（12）United States Patent
Welin et al.

(10) Patent No.: US 8,848,538 B2
(45) Date of Patent: Sep. 30, 2014

(54) POWER-SAVING FUNCTIONS IN COMMUNICATIONS NETWORKS

(75) Inventors: Annikki Welin, Solna (SE); Christian Gotare, Getinge (SE); Johan Kolhi, Vaxholm (SE); Tomas Thyni, Jarfalla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 164 days.

(21) Appl. No.: 13/376,891

(22) PCT Filed: Jun. 9, 2009

(86) PCT No.: PCT/SE2009/050694
§ 371 (c)(1),
(2), (4) Date: Dec. 8, 2011

(87) PCT Pub. No.: WO2010/144002
PCT Pub. Date: Dec. 16, 2010

(65) Prior Publication Data
US 2012/0082057 A1    Apr. 5, 2012

(51) Int. Cl.
*H04L 12/12* (2006.01)
*H04L 12/801* (2013.01)
*H04L 12/26* (2006.01)
*H04L 12/723* (2013.01)
*H04L 12/701* (2013.01)
*H04L 12/729* (2013.01)
*H04L 12/803* (2013.01)
*H04L 12/24* (2006.01)

(52) U.S. Cl.
CPC ............... *H04L 12/12* (2013.01); *H04L 47/11* (2013.01); *Y02B 60/42* (2013.01); *Y02B 60/34* (2013.01); *H04L 43/0876* (2013.01); *Y02B 60/32* (2013.01); *H04L 45/50* (2013.01); *H04L 45/00* (2013.01); *H04L 45/125* (2013.01); *H04L 47/125* (2013.01); *H04L 41/0833* (2013.01); *H04L 41/06* (2013.01)
USPC ..................... 370/236; 370/235; 370/252

(58) Field of Classification Search
USPC ......... 370/216, 217, 225, 228, 237, 238, 230, 370/231, 220
See application file for complete search history.

(56) References Cited

U.S. PATENT DOCUMENTS 6,778,492 B2 * 8/2004 Charny et al. .............. 370/228
7,174,389 B2 2/2007 Orava et al.

(Continued)

OTHER PUBLICATIONS

Kyungtae Woo: "Non-blocking, localized routing algorithm for balanced energy consumption in mobile ad hoc networks" Modeling, Analysis and Simulation of Computer and Telecommunication SYStems, 2001. Proceedings. Ninth International Symposium on August 15-18, 2001, Piscataway, NJ, USA, IEEE, Aug. 15, 2001, XP010555696 ISBN: 978-0-7695-1315-7.

(Continued)

*Primary Examiner* — Edan Orgad
*Assistant Examiner* — Emmanuel Maglo (57) ABSTRACT

Embodiments of the present invention include a communications network using end-to-end tunnels. A control unit monitors the traffic load on at least two paths, as well as determines a power saving traffic distribution if the total traffic on the at least first and second paths if the traffic load does not exceed the capacity of both or all paths between the same end nodes. The power saving traffic distribution puts at least one of the first and second paths in a standby mode in which it carries no traffic. A command unit redirects traffic according to the power saving distribution and to order at least one network element or at least one link in the path or paths to be put in standby mode to enter into a power saving standby mode.

11 Claims, 4 Drawing Sheets

(56) References Cited

U.S. PATENT DOCUMENTS

| | | | |
|---|---|---|---|
| 7,339,489 B2 | 3/2008 | Arita et al. | |
| 7,602,706 B1 | 10/2009 | Gardo et al. | |
| 7,787,362 B2* | 8/2010 | Xu | 370/217 |
| 8,463,120 B2* | 6/2013 | Zhang et al. | 398/5 |
| 2003/0152024 A1* | 8/2003 | Yang et al. | 370/216 |
| 2005/0013242 A1* | 1/2005 | Chen et al. | 370/228 |
| 2005/0207337 A1* | 9/2005 | Oda et al. | 370/214 |
| 2006/0182035 A1* | 8/2006 | Vasseur | 370/238 |
| 2006/0203720 A1* | 9/2006 | Kano | 370/228 |
| 2007/0105562 A1 | 5/2007 | Ji | |
| 2007/0160061 A1 | 7/2007 | Vasseur et al. | |
| 2007/0201380 A1 | 8/2007 | Ma et al. | |
| 2008/0117806 A1* | 5/2008 | Xu | 370/217 |
| 2008/0192627 A1* | 8/2008 | Lichtwald | 370/228 |
| 2010/0208741 A1* | 8/2010 | Vasseur | 370/400 |
| 2012/0207012 A1* | 8/2012 | Kompella | 370/216 |

OTHER PUBLICATIONS

Berger, et al.: "PathErr Message Triggered MPLS and GMPLS LSP Reroute". draft-ietf-mpls-gmpls-lsp-reroute-03.txt. Nov. 25, 2008.

* cited by examiner

| Type | Length |
|------|--------|
| TLV value green ||

Fig. 6

POWER-SAVING FUNCTIONS IN COMMUNICATIONS NETWORKS

TECHNICAL FIELD

The present invention relates to a communications network and to a method of controlling such a communications network. In particular, the invention relates to power-saving functions in communications networks using tunnelling.

BACKGROUND AND RELATED ART

In many types of network today, connections may be provided in the form of tunnels. Tunnelling may be used to achieve protocol independence, or to provide a secure path through a network that is not trusted from a security point of view. Tunnelling techniques may be used together with protection switching, in which a secondary path is provided for one or more primary paths. In the case of failure of the primary path or paths, the traffic on the affected path or paths will be switched to the secondary path.

In all areas of society there is an increasing desire to be environmentally friendly. One important aspect of this is to make present applications more energy efficient. Preferably power consumption should be reduced without reducing the performance of the application as perceived by the user.

For example, Central Processing Units (CPU) can be made more and more energy efficient today, even with a high processing power. There is a desire also to achieve more energy-efficient communications networks, including different types of networks, such as core networks, access networks and/or local networks such as Local Area Networks (LAN), business networks, etc.

SUMMARY OF THE INVENTION

It is an object of the invention to enable a more energy-efficient operation of networks using tunnelling techniques.

The invention relates to a control unit for use in a communications network in which at least a first and a second path are arranged between a first end node and a second end node, each path involving an end-to-end tunnel, said control unit comprising:
monitoring means arranged to monitor the traffic load on the at least first and second path
determining means arranged to determine a power saving traffic distribution if the total traffic between the first (R1) and the second (R5, R9) end node could be carried by fewer paths than are arranged between them. In said power saving distribution at least one of the first and second path is put in a standby mode in which it carries no traffic. Command means are arranged to redirect traffic according to said power saving traffic distribution and to order at least one network element or at least one link in the path or paths to be put in standby mode to enter into a power saving standby mode.

The invention also relates to a method in a communications network in which at least a first and a second path are arranged between a first end node and a second end node, each path involving an end-to-end tunnel, said method comprising:
monitoring the traffic load on the at least one primary path and the secondary path
Determining a power saving traffic distribution of the traffic between the first and the second end point, if the traffic load between the first (R1) and the second (R5, R9) end node could be carried by fewer paths than are arranged between them
said power saving distribution involving at least one of the primary paths and/or the secondary path to be put in a standby mode in which it carries no traffic,
redirecting traffic according to said power saving traffic distribution and to order at least one network element in the path or paths put in standby mode to enter into a power saving standby mode.

By placing all network elements or network links not carrying any traffic in a power-saving standby mode, energy can be saved in the network. The control unit is preferably arranged to ensure that this only happens when the traffic load is so low that the remaining active tunnels in the network are sufficient to carry the traffic. The traffic from the tunnels that are put in standby mode is redirected to one or more of the tunnels that are still in active mode.

The control means is preferably arranged to order traffic engineering metrics and/or bandwidth to be set to zero to put the at least one network element into standby mode.

The monitoring means is preferably arranged to identify paths between the same first and second end nodes by monitoring parameters of the traffic in the paths.

The control unit may be arranged for use in an MPLS network. The RSVP-TE, Path messages with the Session object are used to uniquely identify a traffic engineered tunnel in MPLS-TE networks. The RSVP-TE at each of the tunnel's end points can signal the tunnel state to the tunnel, using a object session attribute in a path message, that is local to each session a new type of parameter, TLV is used to describe the state. The tunnel state can be changed to one of the following: active, inactive, standby and shutdown.

Alternatively, the control unit may be arranged for use in a GMPLS network. In this case the un-numbered LSPs are identified with the LSP TUNNEL INTERFACE ID object, with the LSR's Router ID set to the tail-end's RouterID and the Interface ID set to the identifier allocated by the tail-end LSR. These uniquely identify a traffic engineered tunnel in GMPLS.

The session attribute object, with the new TLV type is used in the signalling message to change the state of the LSP to active, inactive, standby or shutdown.

The green monitoring function is informed of the tunneling states.

Similar functions can be accomplished in LDP or in similar signaling protocols, using network management functionality.

The invention also relates to a communications network in which transport tunnelling is used for connections between at least a first end node and a second end node, said communications network comprising at least one control node according to the above for monitoring and controlling at least one protected path.

The communications network may use protection switching for all or part of the network, in which case a secondary path is reserved in case of failure of one or more primary paths between a first end node and a second end node, each path involving an end-to-end tunnel. In this case the control means is further characterized in that
said monitoring means being arranged to monitor the traffic load on the at least one primary path and the secondary path
said determining means being arranged to determine a power saving traffic distribution if the total traffic on the at least one primary path and the secondary path if traffic load does not exceed the capacity of the at lest one primary path, said power saving distribution involving placing said secondary path in the power saving standby mode.

Acronyms
GMPLS—Generalized MPLS
IGP—Interior Gateway Protocol
LDP—Label Distribution Protocol
LER—Label Edge Router
LSA—Link State Advertisement
LSP—Label Switched Plan
LSR—Label Switching Router
MPLS—Multi-Protocol Label Switching
RSVP—Resource Reservation Protocol
TE—Traffic Engineering
TLV—Type Length Value

BRIEF DESCRIPTION OF THE DRAWINGS

The invention will be discussed in more detail in the following with reference to the appended drawings, in which.

DETAILED DESCRIPTION OF PREFERRED EMBODIMENTS

Figure 1:
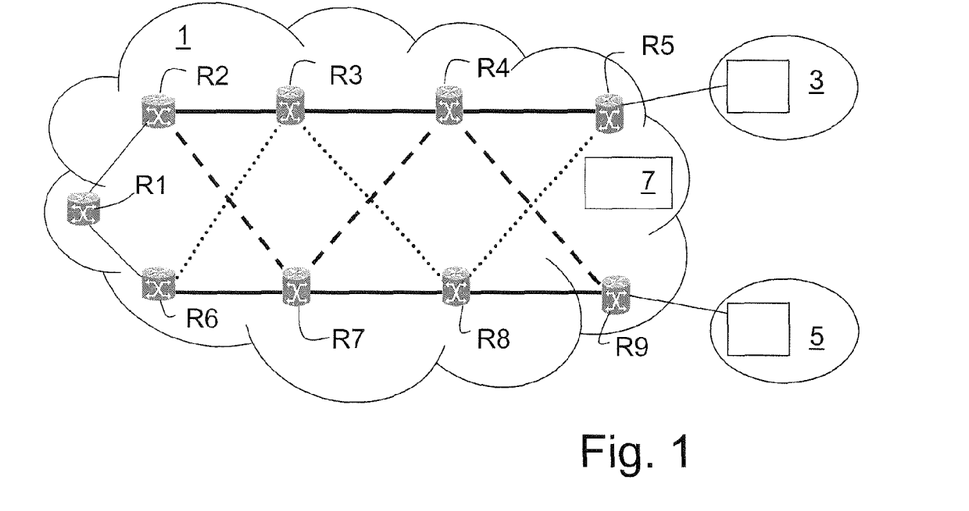
FIG. 1 illustrates an example network in which the inventive functions may be implemented

FIG. 1 illustrates an example communications network comprising a core network, or backbone network 1. The core network typically serves a number of networks providing access to the core network. To illustrate this, FIG. 1 shows an access network 3 and an enterprise network 5 connected to the core network 1. The core network comprises a number of IP routers R1, R2, R3, R4, R5, R6, R7, R8 and R9. The first IP router R1 is typically a provider edge router. A first series of four routers R2, R3, R4, R5 are connected between the first router R1 and the access network 3. A second series of four IP routers R6, R7, R8, R9 are connected between the first router R1 and the enterprise network 5.

In telecommunications systems, when a tunneled network is provisioned, the paths are signalled to be ready to activate the new services. In order to provide protection switching, connections are pre-provisioned with a primary and a secondary path. In the example network shown in FIG. 1, the first series of IP routers forms a primary path between the first router R1 and the access network. An alternative path that may or may not be set up as a secondary path may be formed in different ways, for example, through the first three nodes R6, R7, R8 of the second series and the last node R5 of the first series. The second series of routers R6, R7, R8, R9 forms a primary path between the first router R1 and the enterprise network 5. Again, an alternative path which may serve as a secondary path may be formed in different ways, for example, through the first three nodes R2, R3, R4 of the first series and the last node R9 of the second series. Alternative paths may also be formed between nodes from the first and the second series as shown by the dashed and dotted lines in FIG. 1. For example, the dashed lines between R6, R3, R8 and R5 may provide a path between the first IP router R1 and the access network 3. Similarly, the dotted lines between R2, R7, R4 and R9 may provide a path between the first IP router R1 and the enterprise network 5. Paths may also be formed through only part of the core network 1. The skilled person is familiar with different ways of forming the primary and secondary paths through a core network.

According to the invention the paths are provided as tunnels. In the example above, the tunnels extend between a first end point, being the first router R1 and a second end point being the router R5, R9 nearest to the access network 3 and the enterprise network 5, respectively.

The core network 1 also comprises a control node 7 arranged to monitor the traffic in the network and control the use of the paths. According to the invention, the control node 7 is arranged to determine that a path between two end nodes may be put in a power-saving standby mode if there is an alternative path between the same two end nodes that can carry the traffic between them at a given time. The alternative path may or may not be a secondary path used for protection switching. The monitoring function is described in more detail in co-pending application filed by the same applicant on the same day. The control node 7 is in communication with all network elements, although for clarity these connections are not shown in the Figure.

As will be understood, the elements shown as routers in FIG. 1 could also be other types of elements, such as optical switches or Ethernet switches.

Figure 2:
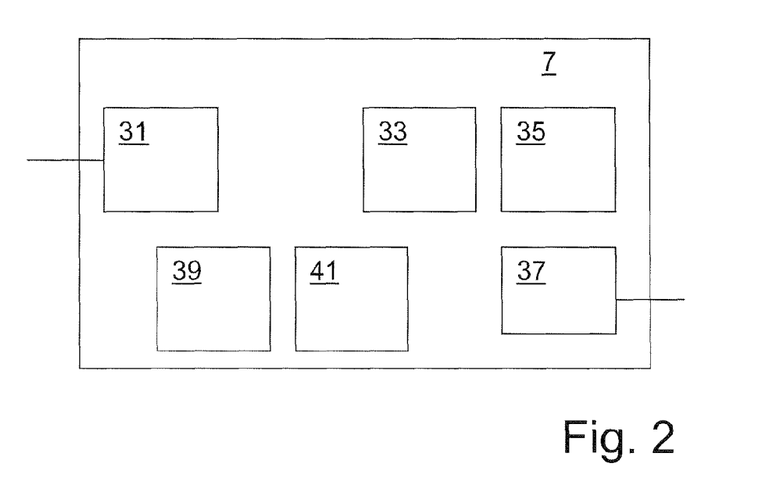
FIG. 2 illustrates a control node that may be used according to the invention.

FIG. 2 illustrates a control node 7 according to an embodiment of the invention. The control node may also comprise other units used for other functions, for example, prior art control functions generally performed by control nodes in communications networks. Functions that are not used in connection with the present invention will not be discussed and are not shown in FIG. 2. As will be understood, the division of the control node into different units is merely done to illustrate the different functions performed by the control node. Typically, the functions performed by the different units shown in the control node are performed by one or more programs arranged to run in the control node.

The control node comprises a monitoring unit 31 arranged to monitor the traffic. The monitoring unit 31 can be arranged as is common in the art and is preferably arranged to monitor each incoming packet with respect to its tunnel end-points. Of course, the monitoring unit 31 may be arranged to monitor other parameters instead, or in addition to the parameters mentioned above, depending on the needs of the network.

As an example, S-flow/Net-flow, Remote Network Monitoring (RMON) may be used for monitoring tunnel flows end-to-end. This means that the start and end points of a tunnel can be identified. Any available monitoring function can be used to supply network status information, such as sampling, real-time measurements and store and forward.

The control node 30 also comprises a determining unit 33 arranged to receive data from the monitoring unit and determine the traffic load in the network and which paths are needed, based on the start and end points of the different flows. The determining node 33 is arranged to determine the number of paths or links needed between the various start and end points.

A selection node 35 is arranged to receive information from the determining unit 33 regarding the number of paths, or links, needed between different start and end points. If all available paths or links are not needed, the selection node 35 selects, based on the information received from the determining unit 33, which nodes should be active and which nodes can be placed in standby mode. A communication unit 37 is arranged to receive information from the determining unit 35 about which nodes are to be placed in standby mode, and to communicate this to the affected node, or nodes, to order them to switch to standby mode.

Similarly, when the selection unit 35 decides that a node that is currently in standby mode should switch to active mode, the communication unit 37 is arranged to order the affected node, or nodes, to switch to active mode.

According to embodiments of the invention, the control node 30 may comprise an identifying unit 39 and/or a trend analyzing unit 41. The identifying unit 39 is arranged to identify packets belonging to the same tunnel, so that such packets can be steered to the correct path, based on the data provided by the monitoring unit 31. This is beneficial, especially when the number of available paths is reduced. The trend analyzing unit 41 is arranged to monitor changes in the traffic load, and to use the changes to predict future changes in the traffic load. This enables the determining unit to determine a future need for active nodes based on predicted future traffic load. By monitoring the individual links and paths through the network statistics and trends can be identified. Analysis of the trends may be used to determine the capacity needs in the network at different times. This enables the inventive monitoring functions to prepare the network links and paths to handle traffic changes in advance.

Figure 3:
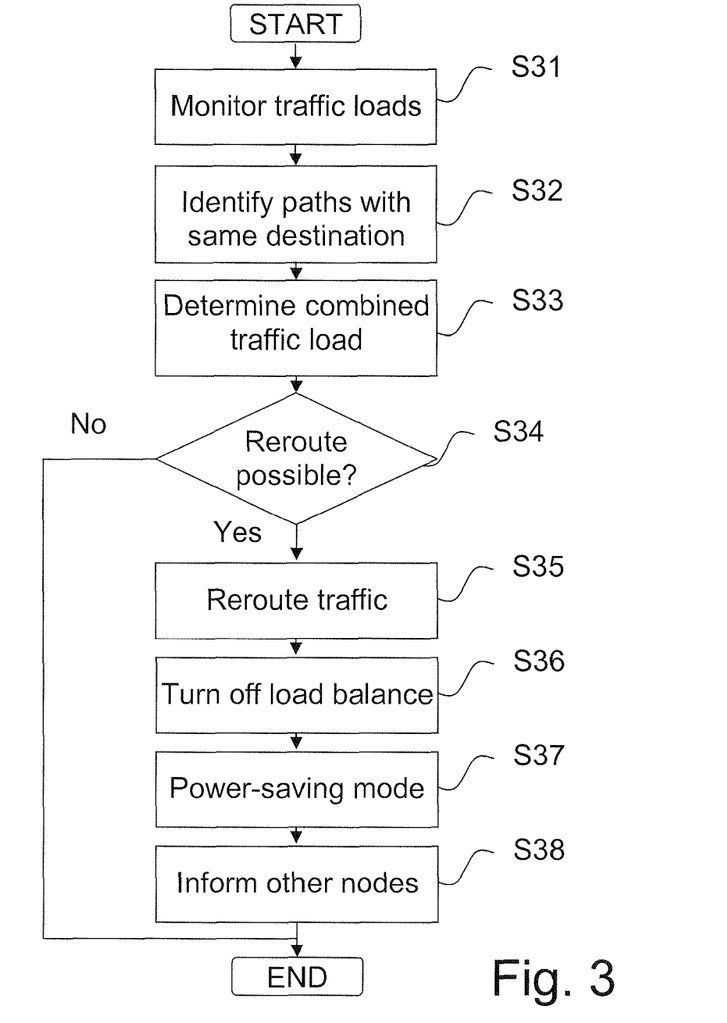
FIG. 3 is a flow chart of a first embodiment of how a path may be identified and set in standby mode.

The identifying unit 39 and the trend analyzing unit 41 are shown as separate units connected between the monitoring unit 31 and the determining unit 33 in the control node shown in FIG. 3. As the skilled person will realize, the units of the control node can be arranged relative to another in any suitable way.

Using tunnelling and having a primary and a secondary path, the traffic in the network is typically load-balanced between the primary and the secondary path and the traffic is distributed equally between them. In these cases the traffic engineering metrics may be the same for the primary and the secondary path. In this way, the two paths together can carry more traffic than one path could have carried. At the same time, there is a backup path for the most important traffic in the case of failure. Alternatively, the primary path is in the active state and the secondary path is up but not in the active state.

According to the invention, functions are provided for concentrating the traffic to one of the paths when the traffic load does not exceed the capacity of the one path.

Consider a situation using load-sharing as describe above. In this case, according to the invention, when the traffic load is low enough to use just one of the paths, the other path, typically the secondary path, is placed in an inactive state. To achieve this, the RSVP-TE signals the "inactive state" with the TE metric set to 0 and the bandwidth set to 0 for the path that is to be in placed in the power-saving mode. As explained above, in the power-saving mode, interfaces along the path are or can be in a stand-by mode using less energy.

Figure 4:
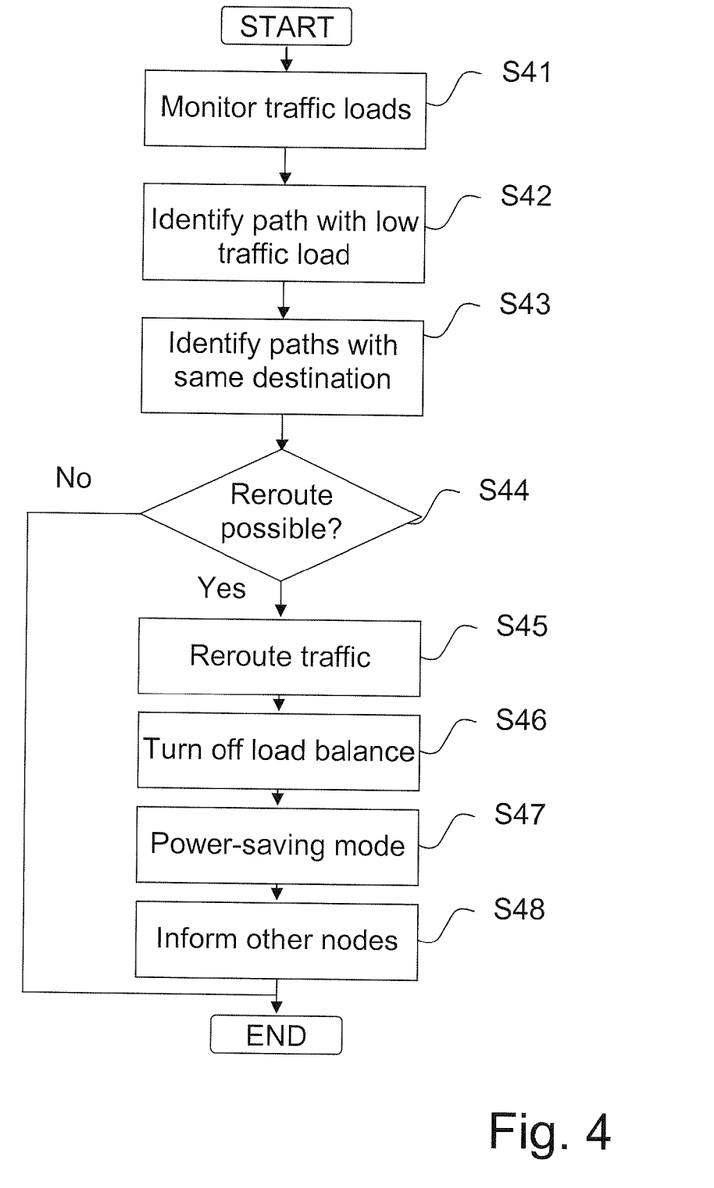
FIG. 4 is a flow chart of a second embodiment of how a path may be identified and set in standby mode.

In the situation in which the secondary path is up but not active, according to the invention the network is monitored and the traffic load trends are recorded. When the monitoring function detects that a path has the same destination as another path and that the traffic loads of the two paths taken together could be carried by one of the paths, it can concentrate the traffic from both paths on one of the paths and place the other path in the power-saving mode. FIGS. 3 and 4 discuss possible methods of achieving this.

FIG. 3 is a flow chart of a first method according to an embodiment of the invention for identifying paths that may be set in standby mode.

In step S31 the traffic loads of paths in the network are monitored. This is done by means of prior art monitoring functions present in the network.

In step S32 paths having the same destination are identified.

In step S33 the combined traffic load of the paths identified in step S32 as having the same destination is determined.

Step S34 is a decision step: Is the combined traffic load of the paths such that one path could carry the whole traffic? If yes, go to step S35; if no, no action should be taken.

Step S35: Reroute the traffic of the paths having the same destination to one of the paths. This is ordered from the control node.

Step S36: If load balancing is used between the paths, the load balancing must be turned off before the other path can be set in standby mode.

Step S37: Place other path in power-saving standby mode. The control node performs this by sending commands to all network elements involved in the other path.

Step S38: The control node informs all other nodes in the network about the status change from active to standby.

FIG. 4 is a flow chart of a second method according to an embodiment of the invention for identifying paths that may be set in standby mode.

In step S41 the traffic loads of paths in the network are monitored. This is done by means of prior art monitoring functions present in the network.

In step S42 a path having a low traffic load is identified.

In step S43 paths having the same destination as the path identified in step S42 are identified.

Step S44 is a decision step: Is the combined traffic load of the paths identified in steps S42 and S43 such that one path could carry the whole traffic? If yes, go to step S45; if no, no action should be taken.

Step S45: Reroute the traffic of the paths having the same destination to one of the paths. This is ordered by the control node.

Step S46: If load balancing is used between the paths, the load balancing must be turned off before the other path can be set in standby mode.

Step S47: Place other path in power-saving standby mode. This is ordered by the control node sending a message to all network elements involved in the other path.

Step S48: The control node informs all other nodes in the network about the status change from active to standby.

Figure 5:
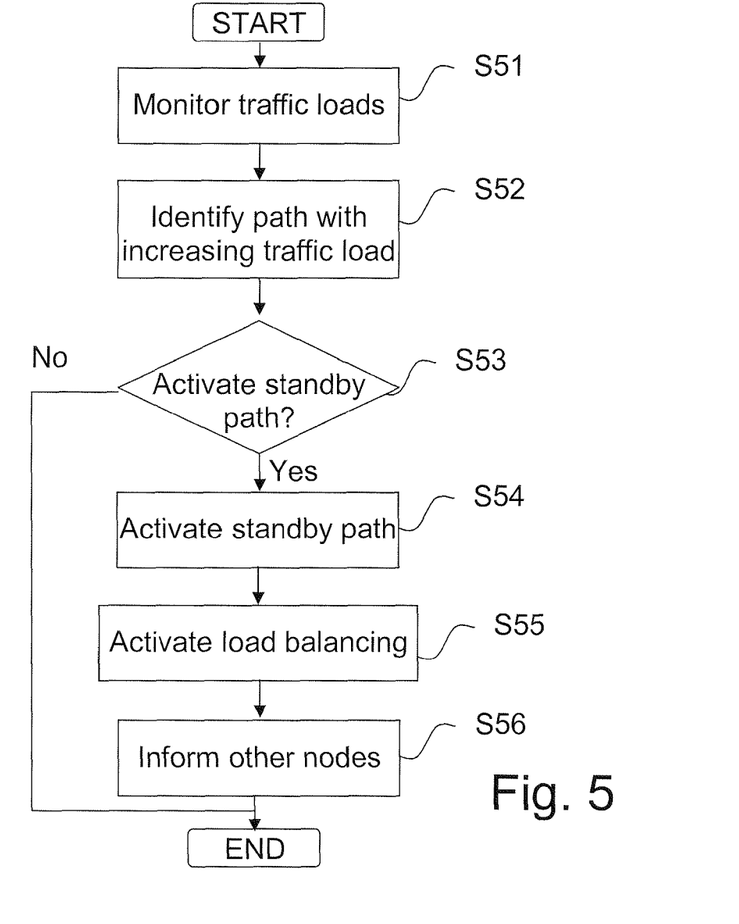
FIG. 5 is a flow chart of an embodiment of how a path may be taken from standby mode to active mode.

FIG. 5 is a flow chart of the method to place a path that is in power-saving standby mode back in active mode:

In step S51 The traffic loads on paths having corresponding standby paths are monitored and trends in the traffic load of each path are established.

In step S52 a path having increasing load is identified.

In step S53 the need to activate the standby path for the identified path is determined, for example, on the basis of the current traffic load and the rate of increase of the traffic load on the identified path.

In step S54 the standby path is activated to enable load sharing between the path identified in step S52 and the standby path.

In step S55, if load balancing is to be used between the paths, load balancing is activated.

In step S56 the control unit informs the other network elements about the status change from passive to active.

To enable monitoring of end-to-end tunnels, as performed in steps S31, S41 and S51 the network management system is able to find the start and end points of protected paths, by means of a monitoring function. According to the invention, these protected paths can be de-activated and ordered to go into a power-saving state, in which the interfaces or nodes in the path are placed in a standby state. The message ordering the standby state will be sent to every LSR interface in the path. Hence, each node in the network will be informed that the TE capability on one or more links, or on an entire LSR will be in a standby state. The standby state is a new power-saving state introduced according to the invention.

The components needed to maintain a Label Switched Path and Label Switched Routers differ slightly between MPLS-TE and GMPLS.

In MPLS-TE the RSVP-TE identifies the MPLS tunnel by the following elements, which are combined in a single RSVP-TE protocol object.
- its destination (IP address)
- a 16-bit tunnel identifier
- an extra identifier, which is an extended tunnel identifier distinguishing multiple tunnels running to the same destination and even recognizing that a particular tunnel may want to allow resource-sharing with traffic flows from many sources or may want to keep the flows separate.

In GMPLS the LSP is identified by the following elements, combined by the sender template object to an RSVP-TE message:
- the IP address of the sender
- a 16-bit LSP ID that is unique in the context of the sender address IN MPLS-TE and GMPLS networks the change to power-saving mode as in steps S36 and S46 above, as well as the change from power-saving mode back to active mode, may be handled according to the following:

When the decision to place a network resource in power-saving mode has been taken no new traffic will be allowed on that resource before the power-saving mode has been switched off. The message to place a network resource in power-saving mode, as in step S36 or S46 above, is preferably signalled using RSVP-TE. The message to switch power-saving mode off for that network resource, to enable traffic on the resource again, is preferably also signalled using RSVP-TE. In both cases the interface address and a Type Length Value (TLV) element containing the command related to power-saving mode may be carried by the ERROR SPEC object.

An interface or whole node where a link will be set in power-saving mode, will trigger the IGP update. The node supporting a link that should be in power-saving mode originates an LSA/LSP traffic element containing link TLV for the link state, having a value indicating that the link, or node, should be in power-saving mode.

When a head-end node, a border node or a node in a segment receives a request to setup a new resource, the decision may be notified by means of a PathErr message using the Reroute error code and the error value indicating power-saving mode. The actual rerouting of traffic is performed according to standardized LSP_REROUTE procedures.

The draft standard "PathErr Message Triggered MPLS and GMPLS LSP Reroute" dated Nov. 25, 2008 defines a format for the PathErr message. According to this draft standard the PathErr message is used to report errors to nodes upstream of the error detecting node without changing the path state in the nodes through which it passes. Therefore, a PathErr message can be used by a node to indicate that it desires an upstream node to reroute an LSP around the indicating node or a resource associated with the indicating node. An indication by a node that an upstream reroute should take place is referred to as a reroute request.

If the node cannot make a local re-route decision, a local resource of a link or a node may be notified, to be able to re-route around the error. To be able to make a local re-route decision the PathErr message must contain an ERROR_SPEC object of the format defined in the draft standard [RFC2205 or [RFC3473].

Figure 6:
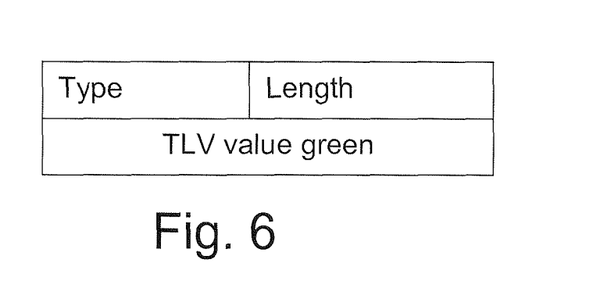
FIG. 6 illustrates a message format that may be used to signal that a tunnel should be placed in standby mode, or go back to active mode.

FIG. 6 illustrates one possible message format for a reroute request that may be used in MPLS or GMPLS for changing the standby state of a tunnel. As will be understood, this is only an example of how such a message could be implemented. The message shown in FIG. 6 may be included in a PathErr message and uses a standard TLV format comprising three fields:

Type: A numeric code which indicates the kind of field that this part of the message represents, in this case, that it relates to the power-saving standby state of network elements.

Length: The size of the value field (typically in bytes).

Value: A set of bytes having the indicated size, in this case whether the power-saving standby state should be activated or deactivated.

The invention claimed is:

1. A control node for use in a communications network in which at least a first and a second path are arranged between a first end node and a second end node, each path involving an end-to-end tunnel, said control node comprising:
   at least one microprocessor;
   a non-transitory computer-readable storage medium, coupled to the at least one microprocessor, further including computer-readable instructions, when executed by the at least one microprocessor, are configured to:
   monitor the traffic load on the at least first and second path,
   determine a power saving traffic distribution if the total traffic between the first and the second end node could be carried by fewer paths than are arranged between them,
   said power saving distribution involving at least one of the at least first and second path to be put in a standby mode in which it carries no traffic, and
   redirect traffic according to said power saving traffic distribution and to order at least one network element or network link in the path or paths put in standby mode to enter into a power saving standby mode, and order traffic engineering metrics and/or bandwidth to be set to zero to put the at least one network element or network link into standby mode.

2. A control node according to claim 1, wherein the computer-readable instructions are further configured to identify paths between the same first and second end nodes by monitoring parameters of the traffic in the paths.

3. A control node according to claim 1 for use in a communications network in which a secondary path is reserved in case of failure of one or more primary paths between a first end node and a second end node, each path involving an end-to-end tunnel, wherein the computer-readable instructions are further configured to
   monitor the traffic load on the at least one primary path and the secondary path,
   determine a power saving traffic distribution if the total traffic on the at least one primary path and the secondary path if traffic load does not exceed the capacity of the at least one primary path,
   said power saving distribution involving placing said secondary path in the power saving standby mode.

4. A communications network in which transport tunnelling is used for connections between at least a first end node and a second end node, and using protection for at least part of the network, wherein the communications network comprises at least one control node according to claim 1 for monitoring and controlling at least one protected path.

5. A control node according to claim 2 arranged for use in an Multi-Protocol Label Switching (MPLS) network, wherein the Resource Reservation Protocol-Traffic Engineering (RSVP-TE) is arranged to identify an MPLS tunnel by destination and actual identifier and an extended tunnel identifier.

6. A control node according to claim 2 arranged for use in an Generalized Multi-Protocol Label Switching (GMPLS) network, wherein the Reservation Protocol-Traffic Engineering (RSVP-TE) is arranged to identify an Label Switched Plan (LSP) by the IP address of the sender and an LSP identifier.

7. A method in a communications network in which at least a first and a second path are arranged between a first end node and a second end node, each path involving an end-to-end tunnel, said method comprising:
monitoring the traffic load on the at least one primary path and the secondary path
determining a power saving traffic distribution if the total traffic between the first and the second end node could be carried by fewer paths than are arranged between them, said power saving distribution involving at least one of the at least first and path to be put in a standby mode in which it carries no traffic,
redirecting traffic according to said power saving traffic distribution and to order at least one network element or network link in the path or paths put in standby mode to enter into a power saving standby mode, wherein the traffic engineering metrics and/or bandwidth to be set to zero to put the at least one network element or network link into standby mode.

8. A method according to claim 7, wherein paths between the same first and second end nodes are identified by monitoring parameters of the traffic in the paths.

9. A method according to claim 7 for use in a network in which a secondary path is reserved in case of failure of one or more primary paths between a first end node and a second end node, each path involving an end-to-end tunnel, comprising
monitoring the traffic load on the at least one primary path and the secondary path,
determining a power saving traffic distribution if the total traffic on the at least one primary path and the secondary path if traffic load does not exceed the capacity of the at least one primary path, said power saving distribution involving placing said secondary path in the power saving standby mode.

10. A method according to claim 8, for use in an Multi-Protocol Label Switching (MPLS) network, wherein the Reservation Protocol-Traffic Engineering (RSVP-TE) is arranged to identify an MPLS tunnel by destination and actual identifier and an extended tunnel identifier.

11. A method according to claim 8 for use in an Generalized Multi-Protocol Label Switching (GMPLS) network, wherein the Reservation Protocol-Traffic Engineering (RSVP-TE) is arranged to identify an Label Switched Plan (LSP) by the IP address of the sender and an LSP identifier.

* * * * *

UNITED STATES PATENT AND TRADEMARK OFFICE
CERTIFICATE OF CORRECTION

PATENT NO. : 8,848,538 B2
APPLICATION NO. : 13/376891
DATED : September 30, 2014
INVENTOR(S) : Welin et al.

It is certified that error appears in the above-identified patent and that said Letters Patent is hereby corrected as shown below:

On the Title Page, item (56), References Cited under "OTHER PUBLICATIONS", in Column 2, Lines 3-4, delete "SY Stems," and insert -- Systems, --, therefor.

In the Specification

In Column 2, Line 64, delete "at lest" and insert -- at least --, therefor.

In Column 4, Line 66, delete "determining unit 35" and insert -- determining unit 33 --, therefor.

In the Claims

In Column 9, Line 19, in Claim 7, delete "path" and insert -- path, --, therefor.

In Column 9, Line 24, in Claim 7, delete "and path" and insert -- and second path --, therefor.

Signed and Sealed this
Twelfth Day of May, 2015

Michelle K. Lee
*Director of the United States Patent and Trademark Office*